June 13, 1933.  R. C. PIERCE  1,914,040
TIRE CONSTRUCTION
Filed Dec. 24, 1931   3 Sheets-Sheet 1
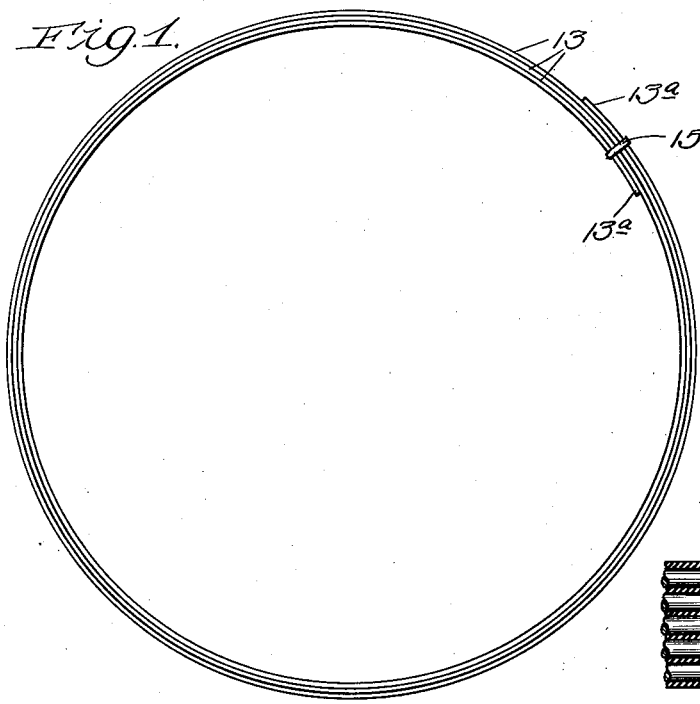
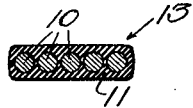
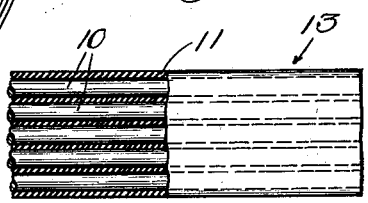
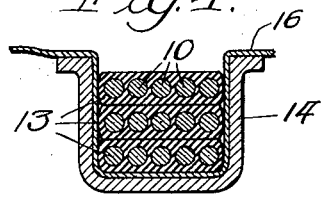
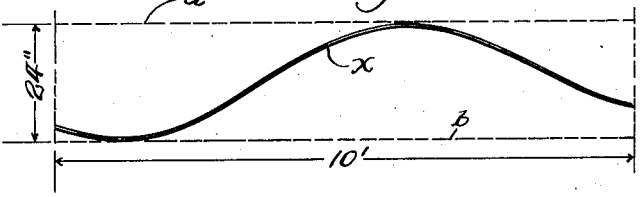
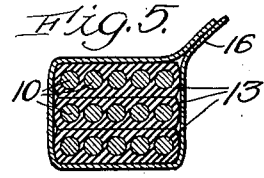
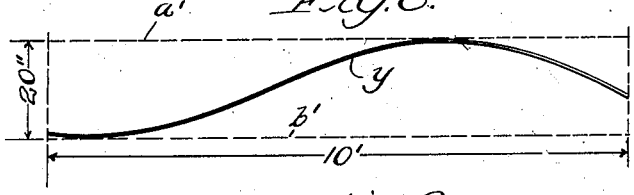
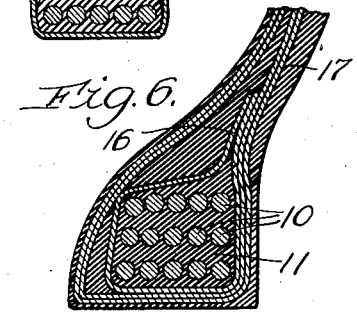
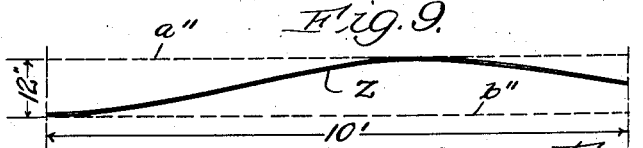
Inventor:
Robert C. Pierce,
By Lyon, Frith, Lee, Chritton & Wiles,
Attys.

June 13, 1933.　　　R. C. PIERCE　　　1,914,040
TIRE CONSTRUCTION
Filed Dec. 24, 1931　　3 Sheets-Sheet 3
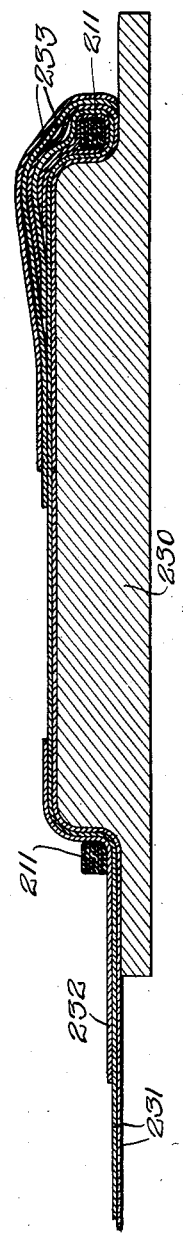
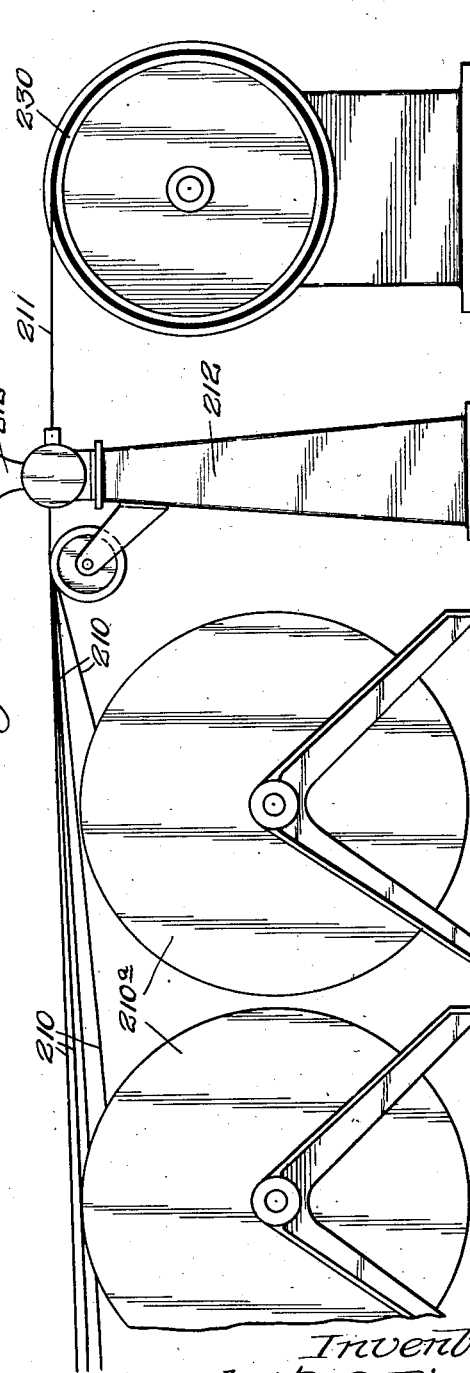

Patented June 13, 1933

1,914,040

UNITED STATES PATENT OFFICE

ROBERT C. PIERCE, OF NILES, MICHIGAN, ASSIGNOR TO NATIONAL-STANDARD COMPANY, OF NILES, MICHIGAN, A CORPORATION OF MICHIGAN

TIRE CONSTRUCTION

Application filed December 24, 1931. Serial No. 583,099.

This invention relates to improvements in tire construction and, more especially, to the bead thereof and process of manufacture.

My invention is especially applicable in connection with the construction of a tire having a bead reinforced by one or more wires therein.

Figure 12:
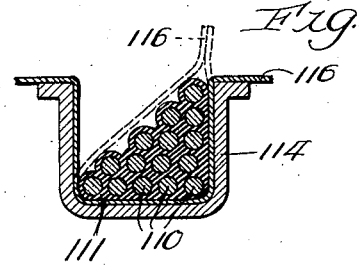

My invention may be practiced, for example, by using the apparatus shown in Alderfer patent, No. 1,727,090 of September 3, 1929, and the process disclosed in Alderfer patent, No. 1,633,620 of June 28, 1927, to which patents I refer for details. In the practice of the inventions shown in these Alderfer patents heretofore, it has been considered necessary or desirable to use a semi-cured bead, that is, a bead that has been given a preliminary shaping and vulcanization before being put in the tire mold. Even in such cases, however, the wires used in the bead shifted or changed their positions during the manufacture of the tire. That is, even though they were wound on the bead-forming ring in regular formation in layers, by the time the tire was completed, they had changed or shifted their positions and rearranged themselves in the bead. This shifting of position and rearrangement of the wires is shown in the Alderfer patents above mentioned where the wires on the bead-forming ring are shown in Fig. 12 in regular formation in layers and where the same wires are shown in a semi-cured bead in Fig. 14 considerably shifted from their original positions and rearranged.

Alderfer patent, No. 1,749,899 of March 11, 1930, also shows a tire bead reinforced by a plurality of wires imbedded therein. The bead of this patent shows the wires held together solely by r... In the practice of the invention of this patent also heretofore, it has been customary to semi-cure the bead before placing it in the tire. The bead in its semi-cured condition is shown in Fig. 5 of this patent. In the practice of this invention as heretofore carried out, the wires reinforcing the bead shifted or changed their positions during the process of manufacturing the tire. Fig. 4 shows the wires in regular formation in layers as they are wound upon the bead-forming ring. As this invention was heretofore practiced, however, the wires in the semi-cured bead had shifted or changed their positions considerably and through shifting, a change of position occurred in the completed bead. This will be clear from an inspection of Figs. 5 and 6 of this Alderfer patent, No. 1,749,899.

My invention is applicable to the making of a tire having a tire bead similar to those shown in the Alderfer patents, and, in fact, a tire bead having any kind of wire reinforcement therein. That is, instead of employing a plurality of independent parallel longitudinal wires each arranged in a plurality of spaced convolutions about the bead, I may employ a single wire wound in a plurality of convolutions arranged in any desired cross-section. The particular feature of my invention is the provision of means and method by which the wire or wires to constitute the reinforcement for the bead may be wound on the bead-forming ring in any desired formation or arrangement. The particular formation or arrangement will remain substantially the same through the various stages of manufacture to the completed bead in the completed tire, and this may be accomplished without semi-curing the bead or giving it any preliminary vulcanization. That is, in the practice of my invention there will be very little, if any, shifting, rearrangement or change in position of the wires from their original arrangement on the tire bead-forming ring.

I accomplish the objects just mentioned by giving the wire or wires used in the bead a preliminary straightening before placing them on the bead-forming ring. In order to accomplish the objects of the invention, such wire or wires must be straightened to a certain degree as hereinafter more specifically set out. That is, I find that my invention cannot be practiced with the ordinary commercial wire of present-day manufacture, even though such wire is known on the market as straight wire. Such commercial wire has a sufficient amount of bends or twists in it so that if used in the manufacture of tire beads, as above set forth, without being given a preliminary straightening, an undesirable amount of shifting or displacement of the wire or wires during the process of manufacturing the tire will occur. By the use of my invention, such shifting of the wires is substantially eliminated and it is also possible to make a very satisfactory tire without semi-curing the bead or giving it any preliminary vulcanization.

Other features and advantages of my invention will appear more fully as I proceed with my specification.

In those forms of devices embodying the features of my invention shown in the accompanying drawings—

Figure 10:
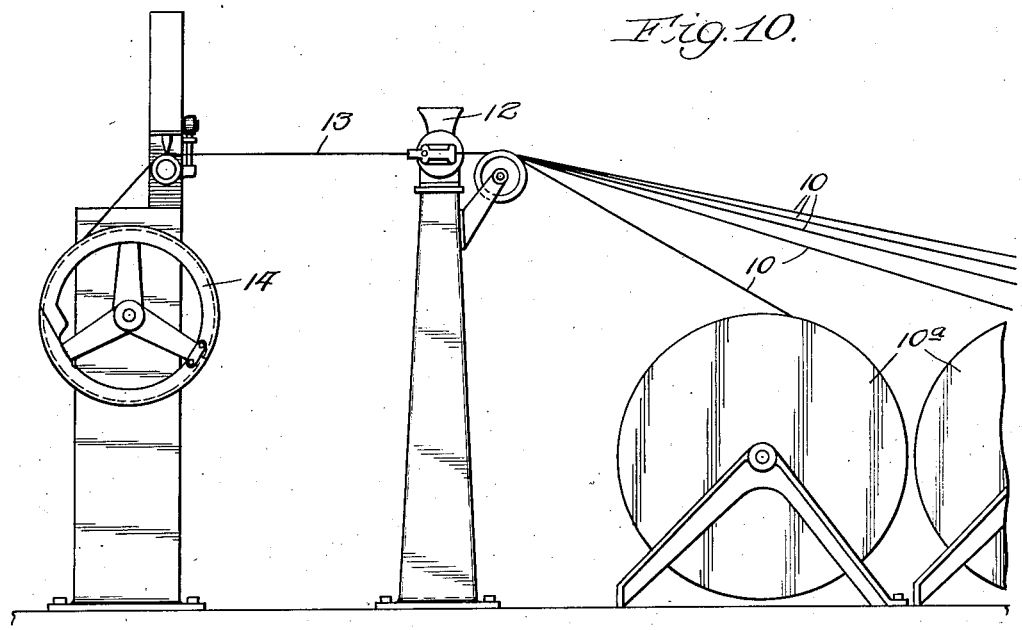
Figure 11:
Figure 13:
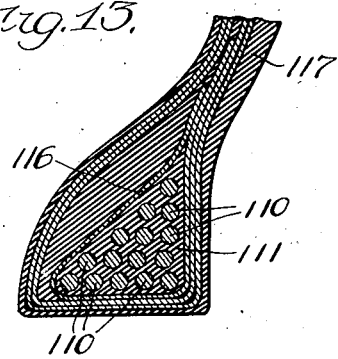
Figure 14:
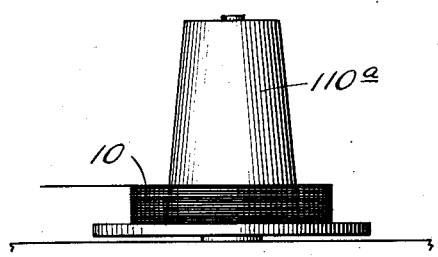

Figure 1 is a view in side elevation of a tire bead with the flipper strip removed; Fig. 2 is a vertical sectional view of a wire tape formed of five wires held together by rubber, said tape being used in the forming of the tire bead; Fig. 3 is a top plan view of the tape showing a portion of the binding rubber removed; Fig. 4 is a vertical sectional view taken through a bead-forming ring showing the tire bead thereon; Fig. 5 is a similar view showing the tire bead removed from a bead-forming ring; Fig. 6 is a vertical sectional view through the bead of a completed tire; Figs. 7, 8 and 9 are diagrammatic views, showing various degrees of straightness in wire; Fig. 10 is a view in side elevation of apparatus for forming a tire bead; Fig. 11 is a view in cross-section of a single wire with a rubber coating; Fig. 12 is a view in vertical section of a bead-forming ring showing a single rubber-coated wire wound thereon to form the bead; Fig. 13 is a fragmentary vertical sectional view of a completed tire showing the bead of Fig. 12 therein; Fig. 14 shows a swift from which the wire may be supplied instead of a reel; Fig. 15 is a sectional view of a tire building drum showing a tire being made thereon; and Fig. 16 is a view in side elevation of the same showing the supplying of wire thereto for reinforcing the bead.

As shown in the drawings, Figs. 1 to 10, inclusive, illustrate the practice of my invention employing five separate wires in the bead, each of said wires arranged in a plurality of spaced convolutions about the bead. As here shown, the five independent wires may be formed into a tape as shown in Figs. 2 and 3, by means of the apparatus and process disclosed in the Alderfer patents above mentioned. In such tape, the five wires, indicated by 10, 10 are held in position solely by the rubber 11. In forming such tape, for example, the wires 10, 10 may be supplied from reels 10$^a$ (or swifts 110$^a$, as shown in Fig. 14) and passed through an extrusion machine 12 to apply to the same the binding rubber 11. The completed tape with the five wires therein I have indicated by 13. Such tape issues from the extrusion machine 12 and is wound on the bead-forming ring 14.

For example, as shown in Fig. 4, there may be wound on said ring three layers of the tape 13. The ends 13$^a$ of the tape may overlap somewhat at one place to provide four layers and the same may be held in position by a suitable clip 15. The bead-forming ring 14 is preferably lined with a strip of fabric, sometimes known as a flipper strip 16, before the tape 13 is wound therein. The edges of this strip are then folded over around the layers of tape, as shown in Fig. 5, when the same is removed from the mold or bead-forming ring 14. The uncured bead of Fig. 5 is then incorporated in the tire and the tire then placed in the mold without any previous semi-curing or vulcanization of the bead. That is, the uncured bead of Fig. 5 is placed in the uncured tire and both are cured together in the tire mold. It will be seen that the wires in the completed tire of Fig. 6 are in substantially the same positions as they occupied in the bead of Fig. 5 and also on the bead-forming ring 14.

In Figs. 11, 12 and 13 I have shown a modification. As here shown, a single wire 110 is employed, the same being coated with rubber 111. This wire is wound on the bead-forming ring 114 inside of a flipper strip 116, the convolutions being arranged to give any desired cross-section of bead. For example, as here shown, the bead is triangular in cross-section. After the requisite number of turns of wire have been placed on the bead-forming ring 114, the flipper strip is folded about the same, as shown by the broken lines in Fig. 12, to form the bead. This bead is then removed from the ring 114 and, without any curing or vulcanizing, is placed in the uncured tire. It is to be understood that the bead remains in an uncured condition until it is placed in the tire mold. Then the tire and bead are cured together in the same operation. A section of the completed tire is shown in Fig. 13 and it will be seen that in the completed bead, the wires 110 retain substantially the same arrangement and formation that they had when wound on the bead-forming ring 114. That is, there is very little, if any, shifting, disarrangement or relocation of the wires with respect to each other from the time they are wound on the bead-forming ring 114 until the tire and bead are given the final curing.

The essential feature in the practice of my invention is the use of straightened wire. I mean by this, wire substantially straighter than the commercially straight wire of present-day manufacture. For convenience, I shall hereafter refer to such wire in the specification and claims as super-straight wire. By using super-straight wire, undesirable shifting of the wires as referred to above can be avoided. In Figs. 7, 8 and 9, I have shown diagrammatically tests for determining the straightness of wire. In Fig. 7, two parallel lines $a$ and $b$ ten feet long are drawn on the floor twenty-four inches apart. A piece of wire $x$ laid on the floor between these lines and unrestrained does not cross either line. When I say does not cross the line, I mean that it does not cross either line where it is resting on the floor or any place above the line. That is, the wire $x$ does not cross either line and does not pass through a perpendicular plane passing through the line.

In Fig. 8, the guide lines $a'$, $b'$ are similarly drawn twenty inches apart, the wire being indicated by $y$. In Fig. 9, the guide lines $a''$, $b''$ are only twelve inches apart and the wire is indicated by $z$. Commercially straight wire of present-day manufacture ordinarily is not straighter than the wire $x$. In the practice of my invention I employ wire substantially straighter than this. That is, I employ a wire as straight as wire $y$ or wire $z$ as super-straight wire.

In Figs. 6 and 13, I use 17 and 117, respectively, to indicate the completed tire.

In speaking of the wire being super-straight even after it is in the bead, I, of course, mean to disregard the resulting curvature that it is given in forming the bead itself.

In Figs. 15 and 16 I have shown the use of super-straight wire in making a tire where the bead is not first formed on a form and then placed in the tire. In the form of apparatus shown in Figs. 15 and 16, the wire or wires are taken directly from reels or swifts coated with rubber either in tape form or in a single strand and wound directly on the tire-building drum. In connection with this apparatus, also, the principal feature of my invention is the employment of super-straight wire as described above. For the purpose of illustrating such use of super-straight wire in the direct manufacture of a tire, I indicate the super-straight wire itself by 210, the same being supplied from any source, for example, the reels 210$^a$. Numeral 212 indicates diagrammatically an extrusion machine similar to the extrusion machine 12 of Fig. 10 adapted to form a tape as shown in Fig. 2. It is to be understood that Fig. 16 serves to illustrate diagrammatically either the coating of several wires simultaneously to form a tape or the coating of a single wire or single strand. In the apparatus here shown, the tape, after being formed, is not wound onto a bead-forming ring but is wound directly onto the tire-building drum 230. In making a tire on this drum, it is first covered with one or more plies of fabric 231 over which is placed the flipper strip 232. The tape, which I have indicated by 211, is then wound over the flipper strip to build up the bead. The protruding edge of the flipper strip and the margins of the fabric are then folded over the bead and additional plies, as 233, put on as desired to form the complete tire on the drum 230. This tire is then placed in the mold and cured in the usual manner.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

As far as I know, the super-straight wire of my invention cannot be put in such condition by the ordinary conventional wire straightening apparatus now in general commercial use. I have, however, invented a machine for producing such super-straight wire. This comprises a plurality of ball bearing mounted rollers adapted to give the wire a series of alternate opposite bends first in one plane and then in a plane substantially at right angles to the first with means for drawing the wire between the rollers, said means including a haul-off drum around which the wire is wrapped. The diameter of such drum is sufficiently great and the tension exerted on the wire in pulling the same between the rollers is such that the wire will not receive a permanent set or bend by being wrapped around the drum. The ball bearing mounted rollers are grooved on the outside to accommodate the wire. The rollers are arranged in two sets, each set including two rows, the rollers in one row being staggered with respect to those in the other. One set of rollers gives the wire a series of alternate opposite bends in one plane and the other set similar bends in another plane substantially at right angles to the first. The bends given by each set of rollers decreases progressively in magnitude.

What I regard as new, and desire to secure by Letters Patent, is:

1. In tire manufacture, the step of first super-straightening wire and then incorporating the same as a reinforcement in the bead of the tire.

2. In tire manufacture, the step of first super-straightening wire, then incorporating the same in a bead, and then incorporating said bead in the tire without any preliminary curing or vulcanizing.

3. In tire manufacture, the step of first super-straightening wire, then coating the same with rubber, then forming the same into a bead, the rubber coating holding the wire in position and then incorporating said bead in a tire.

4. In tire manufacture, the step of first super-straightening wire, then coating the same with rubber, then forming the same into a bead, the rubber coating holding the wire in position and then incorporating said bead in a tire without any preliminary curing or vulcanization.

5. In tire manufacture, the step of first super-straightening a plurality of wires, then forming said wires into a tape and coating the same with rubber to hold them in tape formation, then winding said tape to form a bead, and then incorporating said bead in a tire.

6. In tire manufacture, the step of first super-straightening a plurality of wires, then forming said wires into a tape and coating the same with rubber to hold them in tape formation, then winding said tape to form a bead, and then incorporating said bead in a tire without any preliminary curing or vulcanization.

7. In tire manufacture, the step of first super-straightening wire, then incorporating the same as a reinforcement in the bead of a tire and then curing the tire without giving the bead any preliminary curing or vulcanizing.

8. In tire manufacture, the step of first super-straightening wire, then coating the same with rubber, then forming the coated wire into a bead in a tire, the rubber coating holding the wire in position, and then curing the tire without giving the bead any preliminary curing or vulcanizing.

In witness whereof, I have hereunto set my hand, this 18 day of December, 1931.

ROBERT C. PIERCE.